United States Patent [19]

Kamiguchi et al.

[11] Patent Number: 5,023,028
[45] Date of Patent: Jun. 11, 1991

[54] METHOD AND APPARATUS FOR CONTROLLING A BACK PRESSURE OF A MOTOR-DRIVEN INJECTION MOLDING MACHINE

[75] Inventors: Masao Kamiguchi; Minoru Kobayashi, both of Yamanashi, Japan

[73] Assignee: Fanuc Ltd., Yamanashi, Japan

[21] Appl. No.: 536,551

[22] PCT Filed: Oct. 31, 1989

[86] PCT No.: PCT/JP89/01126
§ 371 Date: Jul. 10, 1990
§ 102(e) Date: Jul. 10, 1990

[87] PCT Pub. No.: WO90/05057
PCT Pub. Date: May 17, 1990

[30] Foreign Application Priority Data
Oct. 31, 1988 [JP] Japan .................. 63-273205

[51] Int. Cl.⁵ ............................ B29C 45/77
[52] U.S. Cl. ..................... 264/40.1; 264/40.5; 425/135; 425/145; 425/149; 425/162
[58] Field of Search ...... 264/40.1, 40.3, 40.4, 264/40.5, 40.7, 328.1; 425/135, 145, 146, 149, 162, 166, 542

[56] References Cited

U.S. PATENT DOCUMENTS 4,758,391  7/1988  Shimizu et al. .............. 264/40.1
4,851,170  7/1989  Shimizu et al. .............. 425/145
4,970,447  11/1990  Kamiguchi et al. ............ 425/145

FOREIGN PATENT DOCUMENTS 61-195818  8/1986  Japan .
61-217227  9/1986  Japan .

Primary Examiner—Jill L. Heitbrink
Attorney, Agent, or Firm—Staas & Halsey

[57] ABSTRACT

A method and an apparatus for controlling the back pressure of a motor-driven injection molding machine, capable of achieving an optimum plasticized state of a molten resin by continuously and smoothly varying a screw receding speed during metering. During execution of a metering process, a numerical control central processing unit of a numerical control device provided in the injection molding machine rotates an injection servomotor in a screw receding direction at a target rotation speed equal to the product of an override value (V) and a rotation speed specified by a numerical control program, while a central processing unit for a programmable machine controller periodically compares the pressure of a resin detected by a pressure sensor with a target back pressure (S6), and in accordance with the result of the comparison, varies the override value by a predetermined amount (X) such that no discontinuous change of the target rotation speed and thus the target back pressure is caused due to the variation of the override value (S7, S8).

4 Claims, 2 Drawing Sheets

METHOD AND APPARATUS FOR CONTROLLING A BACK PRESSURE OF A MOTOR-DRIVEN INJECTION MOLDING MACHINE

TECHNICAL FIELD

The present invention relates to a method and apparatus for controlling a back pressure of a motor-driven injection molding machine, capable of achieving an optimum plasticized state of a molten resin by continuously and smoothly varying a screw receding speed and thus the back pressure actually acting on a screw during metering.

BACKGROUND ART

In motor-driven injection molding machines in which resin is plasticized by rotating a screw by a screw-rotating servomotor and at the same time is metered while the screw is advanced by an injection servomotor to inject the molten resin, it is known to apply a back pressure to the screw by the injection motor against a molten resin pressure acting on the screw in a screw receding direction, and control this back pressure to a target value to obtain a desired plasticized state of the resin when a metering process is in progress.

For example, during the metering, the output torque of the injection servomotor, which rotates in a screw advancing direction, is limited to a torque limit value corresponding to a target back pressure, such that when the molten resin pressure acting on the screw in the screw receding direction becomes higher than the target back pressure, the screw is allowed to move in the receding direction while rotating the injection motor reversely, thereby to control the back pressure to the target value by always balancing the molten resin pressure acting on the screw and the back pressure also acting thereon (see, for example, Japanese Patent Disclosure No. 60-262616). Another back pressure control is also known wherein the injection servomotor is rotated in the screw receding direction by a predetermined rotational angle every time the driving current supplied to the injection servomotor, which represents the output torque thereof, is increased by a predetermined value with an increase in the molten resin pressure. Further, there is still another back pressure control wherein the injection servomotor is rotated at a rotation speed corresponding to a predetermined screw receding speed, to control the output torque thereof to fall within a range corresponding to the target back pressure. Moreover, in another back pressure control method, the screw is receded at a low speed by the injection servomotor and at the same time the screw-rotating servomotor is operated such that the output torque thereof is within a predetermined range.

According to these prior art methods, however, the screw receding speed is occasionally discontinuously varied during the metering, making it unable to control the plasticized state of the resin to a desired one.

DISCLOSURE OF THE INVENTION

An object of the present invention is to provide a method and apparatus for controlling the back pressure of a motor-driven injection molding machine which can attain an optimum plasticized state of molten resin by continuously and smoothly varying a screw receding speed and thus the back pressure actually acting on a screw during a metering process.

To achieve the above object, according to a first aspect of the present invention, there is provided a method for controlling a back pressure of a motor-driven injection molding machine, comprising the steps of: (a) rotating a servomotor, operable to axially move a screw, in a screw receding direction at a target rotation speed equal to a product of an override value and a rotation speed specified by a numerical control program, in a metering process; and (b) varying the override value used in the step (a) such that a detected actual resin pressure becomes equal to a previously set target back pressure. Preferably, in the step (b), the override value is varied at a rate such that no discontinuous change of the target rotation speed is caused due to the variation of the override value.

According to another aspect of the invention, there is provided an apparatus for controlling a back pressure of a motor-driven injection molding machine having a servomotor for axially moving a screw, comprising: setting means for setting a target back pressure; motor driving means for rotating the servomotor in a screw receding direction at a target rotation speed equal to a product of an override value and a rotation speed specified by a numerical control program; pressure detecting means for detecting an actual resin pressure; comparing means for comparing the detected actual resin pressure with the target back pressure; and adjusting means for varying the override value in accordance with a result of the comparison effected by the comparing means. Preferably, the adjusting means varies the override value in accordance with the result of the comparison at a rate such that no discontinuous change of the target rotation speed is caused due to the variation of the override value.

As described above, according to the present invention, during the metering process, the servomotor for axially moving the screw is rotated in the screw receding direction at a target rotation speed equal to the product of the override value and the rotation speed specified by the numerical control program, and simultaneously, the override value is varied to bring the actual resin pressure to the target back pressure, preferably at a rate such that no discontinuous change of the target rotation speed is caused due to the variation of the override value. Accordingly, the actual back pressure can be automatically controlled to the target back pressure smoothly with high accuracy, without causing a discontinuous change in the screw receding speed and thus in the back pressure actually acting on the screw.

BEST MODE OF CARRYING OUT THE INVENTION

Figure 1:
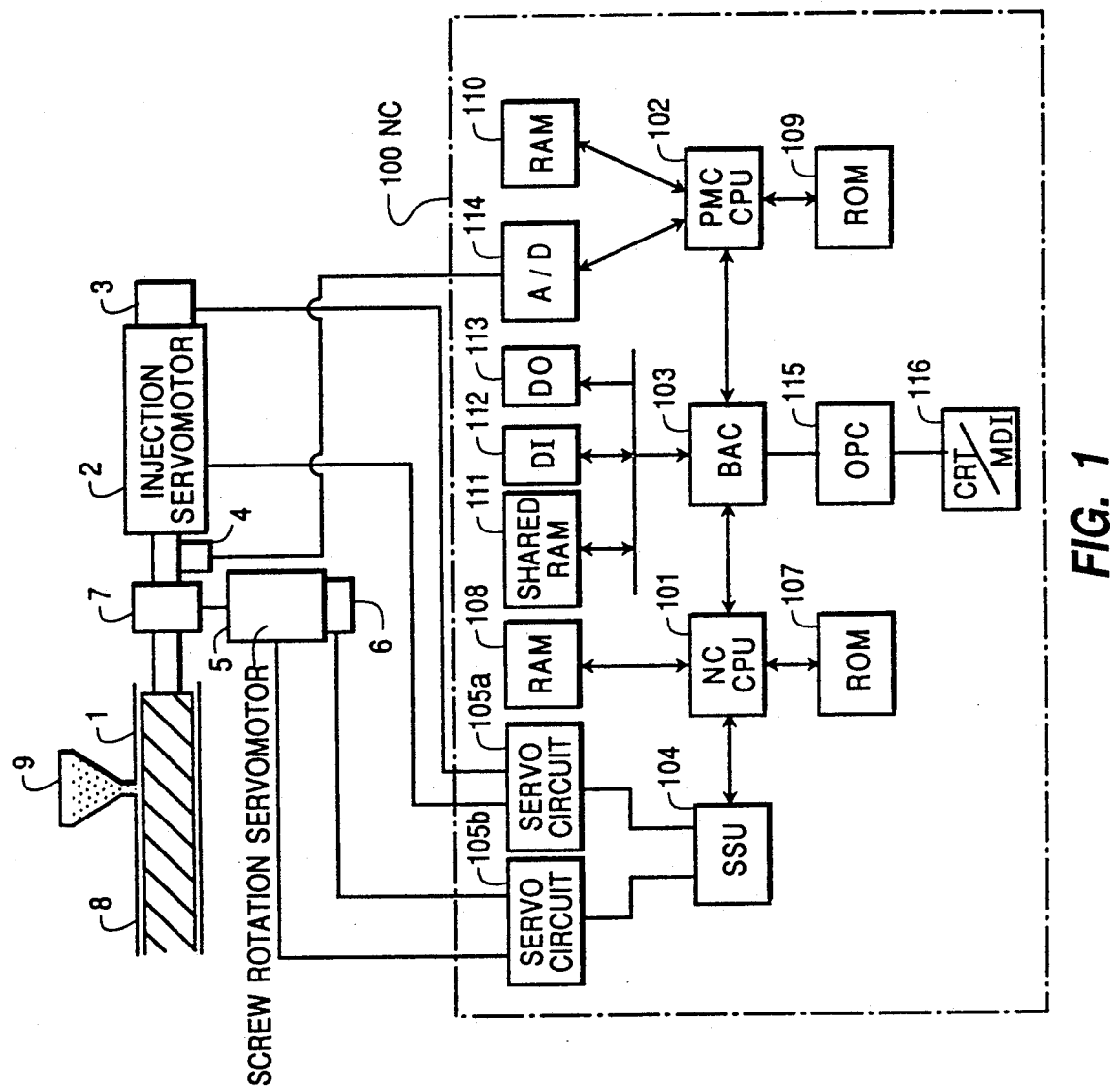
FIG. 1 is a diagram showing a principal part of a motor-driven injection molding machine equipped with a back pressure control apparatus according to one embodiment of the present invention.

A motor-driven injection molding machine, which is equipped with a back pressure control apparatus according to one embodiment of the present invention, comprises various operating parts, such as an injection mechanism and a screw rotating mechanism hereinafter described, and a clamping mechanism and an ejecting mechanism, neither of which is shown, and is arranged to control the operation of these operating parts by means of a numerical control device (hereinafter referred to as NC device) described later, and a programmable machine controller (not shown). The injection molding machine also comprises various sensors and various actuators including servomotors described hereinafter.

The injection mechanism includes a screw 1 rotatably and axially movably received within a heating cylinder 8 communicating with a hopper 9 for feeding a resin material, and an injection servomotor 2 for axially driving the screw 1 via a rotary motion/linear motion conversion mechanism (not shown). A pulse coder 3 is mounted to the servomotor 2 to detect the rotational position of same which represents the axial position of the screw 1. The screw rotating mechanism includes a screw rotating servomotor 5 for rotating the screw 1 through a transmission mechanism 7, and a pulse coder 6 is mounted to the servomotor 5 to detect the rotational position thereof. The aforesaid rotary motion/linear motion conversion mechanism includes a pusher plate (not shown) coupled to a servomotor-side end of the screw 1 and linearly movable together with the screw, and a pressure sensor 4 comprising, e.g., a load cell, is mounted at the connecting portion between the pusher plate and the screw 1, to detect the pressure of a resin acting on the screw.

The NC device 100 includes a central processing unit 101 for numerical control (hereinafter referred to as NCCPU), which is connected to a ROM 107 for storing a monitor program for globally controlling the injection molding machine, and a RAM 108 for temporarily storing data, and is also connected through a servo-interface 104 to servo circuits for controlling the operation of respective servomotors for various operating parts (only two servo circuits associated with servomotors 2 and 5 are illustrated at 105a and 105b, respectively). The NC device 100 also includes a central processing unit 102 for a programmable machine controller (hereinafter referred to as PMCCPU), which unit is connected to a ROM 109 for storing a sequence program for controlling a sequence operation of the injection molding machine, etc., a RAM 110 for temporarily storing data, and an A/D converter 114 for converting an analog output signal from the pressure sensor 4 into a digital signal.

Reference numeral 111 denotes a nonvolatile shared RAM comprising a bubble memory, CMOS memory or the like and storing a numerical control program (hereinafter referred to as NC program), as well as various molding condition parameters including target back pressures set as a function of the axial position of the screw 1 corresponding to a plurality of metering stages, an initial value of an override value hereinafter described, and a predetermined amount of change of the override value. The shared RAM 111 includes a current value register (not shown), into which a current rotational position of the injection servomotor 2 representing a current screw postion is periodically written under the control of the NCCPU 101.

Reference numerals 112 and 113 respectively denote an input circuit connected to individual sensors of the various operating parts, and an output circuit connected to individual actuators of the various operating parts. Buses of the aforementioned elements 101, 102 and 111 to 113 are connected to a bus arbiter controller (hereinafter referred to as BAC) 103, which controls the selection of buses usable in a particular information processing execution cycle of the NC device 100. A manual data input device with a CRT display device (hereinafter referred to as CRT/MDI) 116 is connected to the BAC 103 through an operator panel controller 115, so as to permit an operator to input various control parameters including the molding condition parameters by operating various keys including software keys and a ten key pad. To enable any desired one of a large number of functions of the NC device 100 to be selected through operation of a predetermined number of software keys, relations between the individual software keys and functions of the NC device 100 are variable in accordance with the operator's selection on the display screen.

Further, the NC device 100 has an override function, and with regard to the present invention, it operates to calculate the product of a command rotation speed for the injection servomotor 2, specified by the NC program, and an override value (2% to 100%), as a target rotation speed, and effect pulse distribution to the servo circuit 105a associated with the injection servomotor 2 through the servo-interface 104 in accordance with the calculated target rotation speed. The servo circuit 105a is provided with an error register (not shown) for receiving a command pulse train distributed from the NCCPU 101 at a frequency corresponding to the target rotation speed and representing a target rotational position of the injection servomotor 2, and a pulse train from the pulse coder 3 representing an actual rotational position of the servomotor 2. The servo circuit 105a operates to determine a torque command voltage in accordance with the deviation (speed deviation) between a speed command voltage corresponding to the output of the error register indicative of the actual position deviation and a voltage corresponding to the pulse generation frequency of the pulse coder 3 and representing the actual rotation speed of the servomotor, and control the output torque of the injection servomotor 2 in accordance with the deviation between the torque command voltage and a voltage detected by suitable means (not shown) and representing an actual output torque of the servomotor.

The PMCCPU 102 has registers for storing the information used for the execution of a back pressure control process hereinafter described, namely, a register for storing a first flag Fx (FIG. 2) indicating whether or not the metering process is in progress, a register for storing a second flag Fc (FIG. 2) indicating whether or not the current screw position coincides with any one of specific screw positions including a metering process end position and a plurality of back pressure switching positions at which switching is made between adjacent metering stages, and a register for storing an index i (FIG. 2) indicating which metering stage is in progress.

Figure 2:
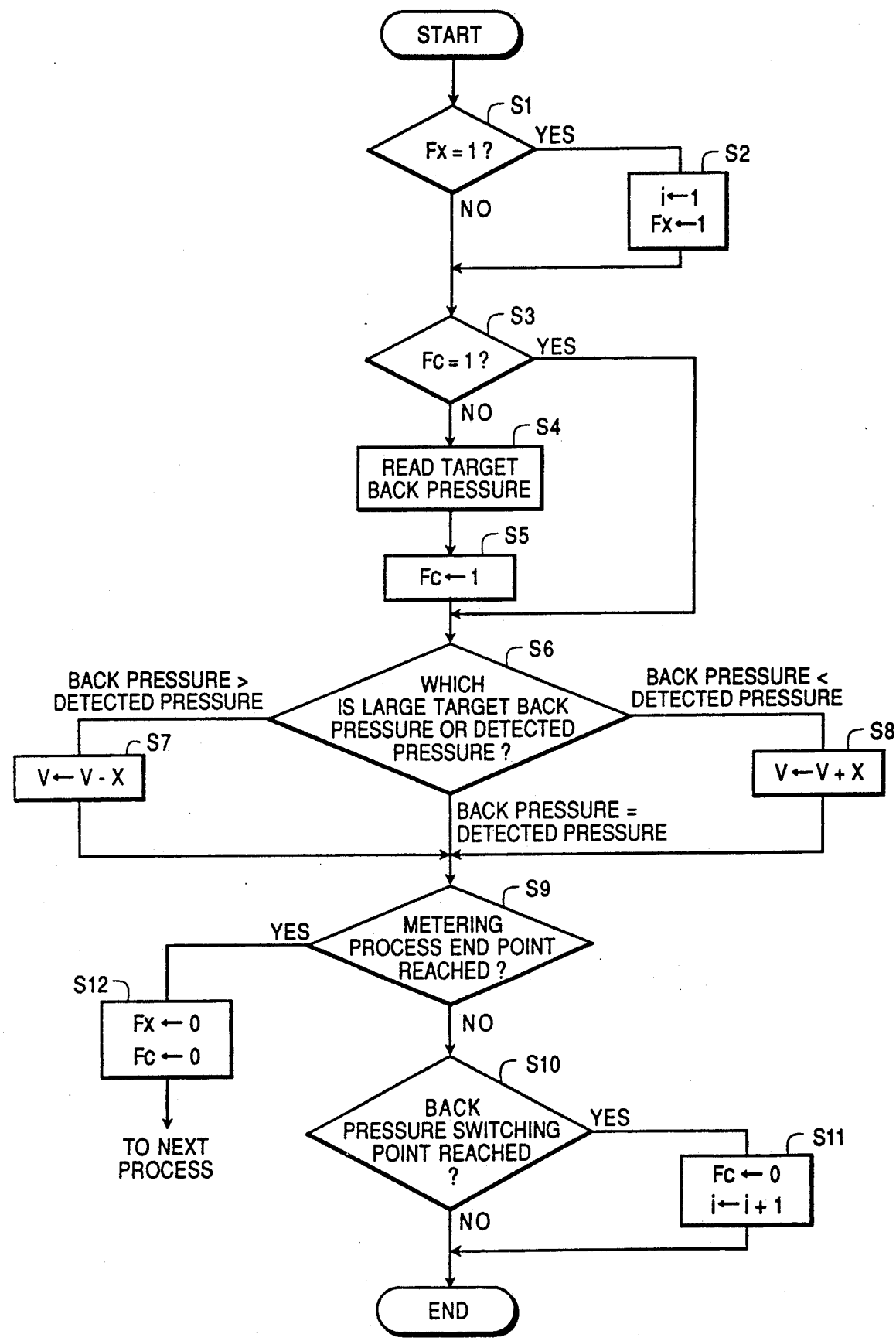
FIG. 2 is a flowchart showing a back pressure control program executed by a central processing unit for a programmable machine controller of FIG. 1.

With reference to FIG. 2, the operation of the injection molding machine with the aforesaid construction will be described.

Before starting an injection molding cycle of the injection molding machine, the operator operates a predetermined software key of the CRT/MDI 116 to cause the CRT/MDI to display an injection molding condition setting menu thereon. This menu shows which functions are assigned to which software keys. The operator then sets various molding conditions by operating the various keys of the CRT/MDI 116. The molding conditions include target back pressures for the respective metering stages, a screw position at the end of the metering process, an initial value of the override value (2% to 100%) which determines, in cooperation with the command rotation speed specified by the NC program, the target rotation speed of the injection servomotor during the metering process, and a predetermined rate of change of the override value (a predetermined amount X of change of the override value during one control period of the back pressure control described later (FIG. 2)).

To enable the target servomotor rotation speed to be variable within a predetermined range, the initial value of the override value V (FIG. 2) is set to 80%, for example. In accordance therewith, the command rotation speed is specified beforehand in the NC program such that when the injection servomotor 2 is rotated in the screw receding direction at the target rotation speed, which is equal to the product of the initial value of the override value V and the command rotation speed, a back pressure substantially equal to the target back pressure is actually produced in the first metering stage. The predetermined amount X of change of the override value is set to value such that no substantially discontinuous change of the target screw receding speed and thus the target back pressure is caused when the override value V is varied by the predetermined amount X during one back pressure control period. The setting values of the aforesaid various molding conditions are stored in the shared RAM 111.

During an operation of the injection molding machine, the NCCPU 101 executes a pulse distribution to servo circuits associated with the related operating parts of the injection molding machine through the servo-interface 104, while the PMCCPU 102 carries out a sequence control on the related operating parts, in accordance with the NC program and various control parameters stored in the shared RAM 111 and the sequence program stored in the ROM 107. Consequently, an injection molding cycle made up of a series of processes, such as mold opening, mold closing, mold clamping, metering, injection, pressure hold, ejection of products, etc., is executed in fundamentally the same manner as in the prior art.

In the metering process, the NCCPU 101 executes a pulse distribution to the servo circuit 105b and the servo circuits 105a associated with the injection servomotor 2 through the servo-interface 104, such that the screw rotating servomotor 5 is rotated at the screw rotating speed specified by the NC program. At the start of the metering process, pulses are distributed to the servo circuit 105a at a frequency corresponding to the target rotation speed which is determined by multiplying the command motor rotation speed specified by the program by the initial value (80%) of the override value.

After the metering process is started, the PMCCPU 102 repeatedly carries out the process shown in FIG. 2 at predetermined periods.

First, the PMCCPU 102 determines whether or not the first flag Fx is "1" indicating that the metering process is in progress (step S1). The first flag Fx is reset to "0" representing non-execution of the metering process at the end of the metering process in each injection molding cycle, as described later, and accordingly, the result of the determination in step S2 in a control period immediately after the start of the metering process is negative (NO). In the next step S2, the CPU 102 sets the index i to "1" to thereby indicate that the first metering stage is in progress, and sets the first flag Fx to "1" to indicate that the metering process is in progress, and then determines whether or not the second flag Fc is "1" (step S3). Since the second flag Fc is set to "0" at the end of the metering process of each injection molding cycle, the result of the determination in step S3 in a control period immediately after the start of the metering process is negative (NO). In this case, a target back pressure corresponding to the first metering stage specified by the index i (=1) (in general, the i-th metering stage specified by the index i) is read from the shared RAM 111 (step S4), and the second flag Fc is set to "1" indicating that the current screw position does not coincide with any of the aforesaid specific screw positions (step S5).

Next the PMCCPU 102 reads the output of the pressure sensor 4 representing a detected resin pressure through the A/D converter 114, and compares the detected resin pressure with the target back pressure of the first metering stage, read in step S4 (step S6). During the metering, as plasticization of the resin proceeds due to rotation of the screw, the pressure of the molten resin is increased. Also, as the screw receding speed is decreased, namely, as the back pressure is increasd, the resin pressure is increased. If it is determined in step S6 that the detected resin pressure representing the actual back pressure is smaller than the target back pressure, the predetermined amount X is substrated from the current override value V (in the present case, from the initial value thereof), to thereby update the override value V in such a direction as to reduce the screw receding speed (step S7). As a result, the target motor rotation speed, which is equal to the product of the command motor rotation speed specified by the program and the override value, is reduced. Thus, the generation frequency of pulses distributed from the NCCPU 101 to the servo circuit 105a is correspondingly decreased. Accordingly, the rotation speed of the injection servomotor 2, and thus, the receding speed of the screw 1 are reduced, whereby the actual back pressure is increased.

On the other hand, if it is determined that the detected resin pressure representing the actual back pressure is higher than the target back pressure, the predetermined amount X is added to the current override value V, to thereby update the override value V in such a direction as to increase the screw receding speed (step S8). As a result, the screw receding speed and thus the actual back pressure are reduced. When it is determined that the detected resin pressure is equal to the target back pressure, then the current override value V is maintained.

After updating or maintaining the override value V in accordance with the determination in step S6, the PMCCPU 102 determines whether or not the screw 1 has reached the metering process end position, based on the current motor rotational position written into the current value register of the shared RAM 111 by the NCCPU 101 (step S9). In the present case, the determination in step S9 is negative, and accordingly, the flow proceeds to step S10 in which it is determined whether or not the screw 1 has reached the first back pressure switching position where the metering stage is switched from the first to the second stage. Since, in the present case, the determination in this step is negative, the back pressure control process shown in FIG. 2 is ended for the current control period.

In the subsequent control period, the aforesaid process is repeated. When the screw 1 reaches the first back pressure switching position (one of the above-mentioned specific screw positions) afterwards, the PMCCPU 102 sets the second flag Fc to "0" indicating that the current screw position coincides with one of the specific screw positions, and adds "1" to the index i. Since the determination in step S3 in the next control period becomes negative, the flow proceeds to step S4 in which a target back pressure for the second metering stage is read, and the override value V is increased or decreased, as in the aforementioned case, such that the detected resin pressure representing the actual back pressure becomes equal to the target back pressure. Thereafter, when it is determined that the screw 1 has reached the metering process end position (one of the aforesaid specific screw position) (step S9), the PMCCPU 102 set the first flag Fx to "0" to indicate non-execution of the metering process, and sets the second flag Fc to "0" indicating the coincidence of the current screw position with one of the specific screw positions (step S12). Thus, the metering process and the back pressure control process associated therewith, shown in FIG. 2, are ended, and the next process of the current injection molding cycle is executed. The aforesaid back pressure control process is thereafter executed in individual injection molding cycles.

We claim:

1. A method of controlling a back pressure of a motor-driven injection molding machine, comprising the steps of:
  (a) rotating a servomotor which is operable to axially move a screw, in a screw receding direction at a target rotation speed equal to the product of an override value and a rotation speed specified by a numerical control program, in a metering process; and
  (b) varying said override value used in said step (a) such that a detected actual resin pressure becomes equal to a previously set target back pressure.

2. A method according to claim 1, wherein in said step (b), said override value is varied at a rate such that no discontinuous change of the target rotation speed is caused due to the variation of the override value.

3. An apparatus for controlling a back pressure of a motor-driven injection molding machine having a servomotor for axially moving a screw, comprising:
  setting means for setting a target back pressure;
  motor driving means for rotating the servomotor, during a metering process of the injection molding machine, in a screw receding direction at a target rotation speed equal to the product of an override value and a rotation speed specified by a numerical control program;
  pressure detecting means for detecting an actual resin pressure;
  comparing means for comparing the detected actual resin pressure with the target back pressure; and
  adjusting means for varying the override value in accordance with a result of the comparison effected by said comparing means.

4. An apparatus according to claim 3, wherein said adjusting means varies the override value in accordance with the result of the comparison at a rate such that no discontinuous change of the target rotation speed is caused due to the variation of the override value.

* * * * *

UNITED STATES PATENT AND TRADEMARK OFFICE
CERTIFICATE OF CORRECTION

PATENT NO. : 5,023,028
DATED : June 11, 1991
INVENTOR(S) : Masao Kamiguchi and Minoru Kobayashi It is certified that error appears in the above-identified patent and that said Letters Patent is hereby corrected as shown below:

Col. 6, line 20, "increased" should be --increased--;
line 24, "substrated" should be --subtracted--.

IN THE DRAWINGS

Fig. 2, "YES" should be --NO--;    see circled notations
"NO" should be --YES--.

Signed and Sealed this

First Day of December, 1992

*Attest:*

DOUGLAS B. COMER

*Attesting Officer*    *Acting Commissioner of Patents and Trademarks*